(12) United States Patent
Tawile et al.

(10) Patent No.: US 10,379,258 B2
(45) Date of Patent: Aug. 13, 2019

(54) METHOD AND DEVICE FOR DETERMINING PROPORTION CUBES

(71) Applicant: TOTAL SA, Courbevoie (FR)

(72) Inventors: Eric Tawile, Courbevoie (FR); Patrice Schirmer, Colombes (FR); Sung-Bin Ahn, Paris (FR); David Ledez, Pau (FR)

(73) Assignee: TOTAL SA, Courbevoie (FR)

( * ) Notice: Subject to any disclaimer, the term of this patent is extended or adjusted under 35 U.S.C. 154(b) by 590 days.

(21) Appl. No.: 14/897,145

(22) PCT Filed: Apr. 11, 2014

(86) PCT No.: PCT/FR2014/050898
§ 371 (c)(1),
(2) Date: Dec. 9, 2015

(87) PCT Pub. No.: WO2014/199027
PCT Pub. Date: Dec. 18, 2014

(65) Prior Publication Data
US 2016/0124114 A1     May 5, 2016

(30) Foreign Application Priority Data
Jun. 11, 2013  (FR) ..................... 13 55400

(51) Int. Cl.
*G01V 99/00*     (2009.01)
(52) U.S. Cl.
CPC ...... *G01V 99/005* (2013.01); *G01V 2210/665* (2013.01)
(58) Field of Classification Search
CPC ............. G01V 99/005; G01V 2210/66; G01V 2210/665; G01V 11/00; G02B 5/124
(Continued)

(56) References Cited

U.S. PATENT DOCUMENTS 8,743,115 B1 * 6/2014 Mallet .................... G01V 1/302
                                                                345/419
9,053,570 B1 * 6/2015 Mallet .................... G06T 17/05
(Continued)

FOREIGN PATENT DOCUMENTS

EP       2 270 548 A1     1/2011

OTHER PUBLICATIONS

International Search Report and Written Opinion for PCT/FR2014/050898, dated Nov. 6, 2014, 3 pgs.
(Continued)

*Primary Examiner* — John E Breene
*Assistant Examiner* — Jeffrey P Aiello
(74) *Attorney, Agent, or Firm* — Patterson Thuente Pedersen, P.A.

(57) ABSTRACT

The present invention relates to a method for determining at least one combined proportion cube. For each one of a plurality of facies, the determination involves receiving a reference proportion cube, said reference proportion cube having a first average proportion, and receiving an auxiliary proportion cube. Furthermore, for at least one of a plurality of facies, the determination comprises the modification of the auxiliary proportion cube, wherein the modified auxiliary proportion cube has a second average proportion, and the second average proportion is at a distance that is lower than a predetermined distance of the first average proportion and the combination of said reference proportion cube and said modified auxiliary proportion cube.

10 Claims, 6 Drawing Sheets

(58) Field of Classification Search
USPC .................................. 382/109; 702/2; 703/2
See application file for complete search history.

(56) References Cited

U.S. PATENT DOCUMENTS

| | | | | |
|---|---|---|---|---|
| 2008/0162093 | A1* | 7/2008 | Nivlet | G01V 1/30 703/2 |
| 2011/0115787 | A1* | 5/2011 | Kadlec | G01V 1/345 345/419 |
| 2011/0231164 | A1* | 9/2011 | Zhang | G01V 99/005 703/2 |
| 2014/0035912 | A1* | 2/2014 | Thorne | G06T 17/05 345/420 |
| 2014/0037197 | A1* | 2/2014 | Thorne | G01V 11/00 382/159 |
| 2015/0009215 | A1* | 1/2015 | Vallikkat Thachaparambil | G06T 19/20 345/420 |

OTHER PUBLICATIONS

English translation of International Search Report for PCT/FR2014/050898, dated Nov. 6, 2014, 3 pgs.

Written Opinion for PCT/FR2014/050898, dated Nov. 6, 2014, 6 pgs.

English translation of Written Opinion for PCT/FR2014/050898, dated Nov. 6, 2014, 6 pgs.

Hoffman et al: "History matching by jointly perturbing local facies proportions and their spatial distribution: Application to a North Sea reservoir", Journal of Petroleum Science and Engineering, Elsevier, Amsterdam, NL, vol. 57, No. 3-4, Jun. 1, 2007 (Jun. 1, 2007), pp. 257-272, XP022101621, ISSN: 0920-4105, DOI: 10.1016/J.Petrol.2006.10.011.

J. Caers, T. Hoffman, S. Strebelle, X-H. Wen: "Probabilistic integration of geologic scenarios, seismic, and production data—a West Africa turbidite reservoir case study", The Leading Edge, Society of Exploration Geophysicists, US, Mar. 2003 (Mar. 2006), pp. 240-244, XP002719924.

\* cited by examiner

METHOD AND DEVICE FOR DETERMINING PROPORTION CUBES

RELATED APPLICATIONS

The present application is a National Phase entry of PCT Application No. PCT/FR2014/050898, filed Apr. 11, 2014, which claims priority from FR Patent Application No. 13 55400, filed Jun. 11, 2013, said applications being hereby incorporated by reference herein in their entirety.

FIELD OF THE INVENTION

The present invention relates to the field of the determination of geological facies in a subsoil in the context of exploration for and the exploitation of hydrocarbons or gas.

BACKGROUND OF THE INVENTION

Determining geological facies in a given field is useful in the context of exploration for an exploitation of high hydrocarbons or gas since this makes it possible best to estimate the available resources and consequently the economic value of the field.

In addition, this determination makes it possible to establish fine models concerning the future production of the fuel according the well parameters.

There thus exist a large number of techniques for establishing facies models using, for example:
- drillings,
- seismic images,
- karstic simulations,
- geostatic simulations,
- conceptual knowledge of geologists (e.g. facies gradient in a direction in space),
- etc.

These techniques may be combined in order to obtain more precise results.

These techniques make it possible to establish qualitative and/or quantitative models.

A quantitative model is a model, for example meshed, where the meshes provide a facies proportion for each of these meshes. A qualitative model is a model, for example meshed, where the meshes provide a trend for each facies: for example, these meshes make it possible to represent the major architectural elements (i.e. to display general or spatial aspects).

Facies models modelling n facies often consist of n proportion cubes, each cube being associated with a facies. For a mesh of the model, the sum of the proportions of the various facies (indicated by a corresponding mesh of their associated proportion cube) is equal to 1.

In order to benefit from the information from various qualitative or quantitative models (in general from 2 models), some methods have been proposed for combining these in a single final proportion model (or combined model).

Since the proportions of the final model may have an influence on the calculation of the hydrocarbon or gas resources, these proportions are followed attentively by geologists.

These methods are for example methods of combining models by minimising variants or methods proposed by commercial tools such as Petrel or by universities.

However, such methods are not free from faults.

For example, these methods in general provide only one solution. In addition, it is not possible to check the resulting proportions in the final model. Usually, the proportions of the final cube are calculated from the proportions of the initial cubes.

Furthermore, it is impossible to "apportion" the information provided by the various models and thus to "penalise" some models where the confidence index evaluated by geologists, geophysicists and/or well engineers is for example lower.

There is thus a need for a more flexible model combination method making it possible to check the resulting proportions, these proportions being able to be known very precisely by means of well data recorded on site.

SUMMARY OF THE INVENTION

The present invention will improve the situation. To this end, the present invention proposes to very finely control the final proportions of the combination.

The present invention therefore relates to a method for determining at least one combined proportion cube for a facies of a geological model comprising a plurality of facies.

The method comprises the steps of:
for each facies in the plurality of facies:
  receiving a reference proportion cube, said reference proportion cube having a first mean proportion;
  receiving an auxiliary proportion cube;
for at least one facies in the plurality of facies:
  modifying said auxiliary proportion cube, said modified auxiliary proportion cube having a second mean proportion, the second mean proportion being at a distance less than a predetermined distance from the first mean proportion;
  combining said reference proportion cube and said modified auxiliary proportion cube.

The auxiliary proportion cube may be modified in many ways. For example, firstly, it is possible to increase or decrease the proportions of each mesh of the auxiliary proportion cube by a value $\Delta P$ (if the difference between the mean proportion of the auxiliary proportion cube and of the reference proportion cube, for a given facies, is $\Delta P$). It is also possible to add to or subtract from these proportions a value $\Delta p$ as many times as necessary in order to change the mean proportion of the auxiliary proportion cube to a distance less than $\Delta p$ from the mean proportion of the reference proportion cube.

In addition, secondly and optionally, if the sum of the modified auxiliary cubes is strictly greater than 1 (or respectively strictly less than 1), it is possible to multiply the proportions of the meshes of these modified auxiliary cubes by a given number less than 1 (or respectively greater than 1) as many times as necessary so that this sum is less than 1 (or respectively greater than 1). It is also possible to multiply these proportions by the ratio of the means of the auxiliary and reference cubes.

In one embodiment, the combination being linear, the sum of the coefficients of said linear combination may be equal to 1.

For each facies i in the plurality of facies:
  the reference proportion cube may comprise a first plurality of meshes, each of said meshes j being associated with an initial reference local proportion value $r_{i,j}^0$
  the auxiliary proportion cube may comprise a second plurality of meshes, each of said meshes j being associated with an initial auxiliary local proportion value $a_{i,j}^0$.

In one embodiment, and for at least two facies i in the plurality of facies, the modification may comprise, for each mesh j:

a) initialisation of a current auxiliary local proportion value a to $a_{i,j}{}^0$;
  b) determination of a first current auxiliary local proportion value $a_{i,j,re\ dim}{}^k$ according at least to:
    the mean of the initial reference local proportion values $\overline{r_i^0}$ for the meshes of the reference proportion cube of the facies i,
    the mean of the current auxiliary local proportion values $\overline{a_i^k}$ for the meshes of the auxiliary proportion cube of the facies i,
    the current auxiliary local proportion value $a_{i,j}{}^k$ for the mesh j of the auxiliary proportion cube of the facies i;
  c) determination of a second current auxiliary local proportion value $a_{j,norm}{}^k$ according at least to:
    the resized current auxiliary local proportion value $a_{i,j,re\ dim}{}^k$ for the facies i,
    the sum of the resized current auxiliary local proportion values $a_{i,j,re\ dim}{}^k$ for all the facies in the plurality of facies;
  d) if the second mean proportion is not at a distance less than a predetermined distance from the first mean proportion, reiteration of steps a) to c) replacing the initial reference local proportion value $a_{i,j}{}^0$ with $a_{j,norm}{}^k$.

The modification may be made in parallel for the at least two facies.

A "local proportion" is a proportion value of a facies in a mesh of a proportion cube.

A "current value of the auxiliary proportion cube" is a proportion value of a modified auxiliary proportion cube. If the auxiliary proportion cube has not yet been modified, the current value is the initial local proportion of the auxiliary proportion cube.

The determination of the first current value may have the objective of aligning the mean proportions of the auxiliary proportion cube and of the reference proportion cube.

The determination of the second current value may have the objective of satisfying the property according to which the corresponding meshes of the auxiliary cubes for each of the facies add up to 1 (i.e. the proportions of the various facies for a given point on the model add up to 1).

Naturally it may be possible to directly calculate the second current value without explicitly calculating the first current value. This is because the calculation of the second value may implicitly include the calculation of the first value.

It is therefore possible to define a sequence as follows, for each facies i and for each mesh j:

$$(a_{i,j}^k)_k = \begin{cases} a_{i,j}^0 & \text{initial auxiliary local proportion value of the auxiliary cube received} \\ a_{i,j}^{k+1} = a_{j,norm}^k \end{cases}$$

As the calculation of $a_{j,norm}{}^k$ may involve modified auxiliary cubes of the other facies, it may be useful to calculate the various facies in parallel. This parallelism can be done determination by determination (i.e. the determination of the first value is done for all the facies, and then the determination of the second value is done for all the facies, etc.). Nevertheless, it is also possible for this parallelism to be less strict (e.g. the determination of the first value and of the second value is done for the first facies, then for the second facies, etc.).

"Mean of the initial/current local proportion values for all the meshes of a proportion cube" means a mean of the initial/current local proportion values for all the meshes of said cube or a subset of meshes thereof.

For each facies i in the plurality of facies,
  the reference proportion cube may comprise a first plurality of meshes, each of said meshes j being associated with an initial reference local proportion value $r_{i,j}{}^0$,
  the auxiliary proportion cube may comprise a second plurality of meshes, each of said meshes j being associated with an initial auxiliary local proportion value $a_{i,j}{}^0$, In one embodiment, and for at least two facies i in the plurality of facies, the modification may comprise, for each mesh j:

a) initialisation of a current auxiliary local proportion value $a_{i,j}{}^k$ to $a_{i,j}{}^0$;
  b) determination of a first current auxiliary local proportion value $a_{i,j,re\ dim}{}^k$ according at least to:
    the mean of the reference initial local proportion values $\overline{r_i^0}$ for the meshes of the reference proportion cube of the facies i,
    the mean of the current auxiliary local proportion values $\overline{a_i^k}$ for the meshes of the auxiliary proportion cube of the facies i,
    the current auxiliary local proportion value $a_{i,j}{}^k$ for the mesh j of the auxiliary proportion cube of the facies i;
  c) determination of a second current auxiliary local proportion value $a_{j,norm}{}^k$ according at least to:
    the resized current auxiliary local proportion value $a_{i,j,re\ dim}{}^k$ for the facies i,
    the sum of the resized current auxiliary local proportion values $a_{i,j,re\ dim}{}^k$ for all the facies in the plurality of facies;
  d) if a number of reiterations of steps a) to e) is below a given threshold, reiteration of steps a) to e) replacing the initial reference local proportion value $a_{i,j}{}^0$ with $a_{j,norm}{}^k$.

The modification may be done in parallel for the at least two facies.

This is because the method may converge very quickly and the operator executing the method described may empirically, along with his experience and the input data, determine that a limited number of iterations makes it possible to obtain a satisfactory result.

Moreover, for the at least one facies i in the plurality of facies, the reference proportion cube may comprise a first plurality of meshes, each of said meshes j being associated with an initial reference local proportion value $r_{i,j}{}^0$.

The auxiliary proportion cube may also comprise a second plurality of meshes, each of said meshes j being associated with an initial auxiliary local proportion value $a_{i,j}{}^0$.

Furthermore, the modification may comprise, for each mesh j:
  determination of a first current auxiliary local proportion value $a_{i,j,norm}{}^k$ according at least to:
    the mean of the initial reference local proportion values $\overline{r_i^0}$ for the meshes of the reference proportion cube of facies i,
    the mean of the current auxiliary local proportion values $\overline{a_i^0}$ for the meshes of the auxiliary proportion cube of the facies i, the initial auxiliary local proportion value $a_{i,j}^0$; for the mesh j of the auxiliary proportion cube of the facies i;

In this case, the property according to which the corresponding meshes of the auxiliary cubes for each of the facies add up to 1 (i.e. the proportions of the various facies for a given point on the model add up to 1) is not necessarily complied with. Nevertheless, in certain cases, this property may not be essential (in particular when the sum differs only slightly from 1).

In one embodiment, the first current auxiliary local proportion value $a_{i,j,norm}^k$ may be a function of $$\frac{a_{i,j}^k \cdot \overline{r_i^0}}{\overline{a_i^k}}.$$

In another embodiment, the first current auxiliary local proportion value $a_{i,j,norm}$ may a function of $$\frac{a_{i,j}^0 \cdot \overline{r_i^0}}{\overline{a_i^0}}.$$

In one possible embodiment of the invention, the second current auxiliary local proportion value $a_{i,j,norm}^k$ may be a function of $$\frac{a_{i,j,redim}^k}{\sum_w a_{w,j,redim}^k}$$

with a facies contained in the plurality of facies.

The notation $$\sum_w a_{w,j,redim}^k$$

means that the proportions $a_{i,j,norm}^k$ of the auxiliary cubes modified following the first determination are added for all the facies.

A device intended to determine at least one combined proportion cube may be advantageous, in itself, provided that it makes it possible to check the mean proportions after combination.

Thus the present invention also relates to a device for determining at least one combined proportion cube for a facies of a geological model comprising a plurality of facies.

The device comprises:
 an interface (403) for receiving a reference proportion cube, said reference proportion cube having a first mean proportion;
 an interface (403) for receiving an auxiliary proportion cube;
 a circuit (404) suitable for making it possible, for at least one facies of the plurality of facies:
  to modify said auxiliary proportion cube, said modified auxiliary proportion cube having a second mean proportion, the second mean proportion being at a distance less than a predetermined distance from the first mean proportion;
  to combine said reference proportion cube and said modified auxiliary proportion cube.

A computer program implementing all or part of the method described above, installed on pre-existing equipment, is in itself advantageous provided that it makes it possible to determine at least one combined proportion cube subject to the mean proportions after combination.

Thus the present invention also relates to a computer program containing instructions for implementing the previously described method, when this program is executed by a processor.

This program may use any programming language (for example an object language or other) and be in the form of an interpretable source code, a partially combined code or a completely combined code.

Figure 2:
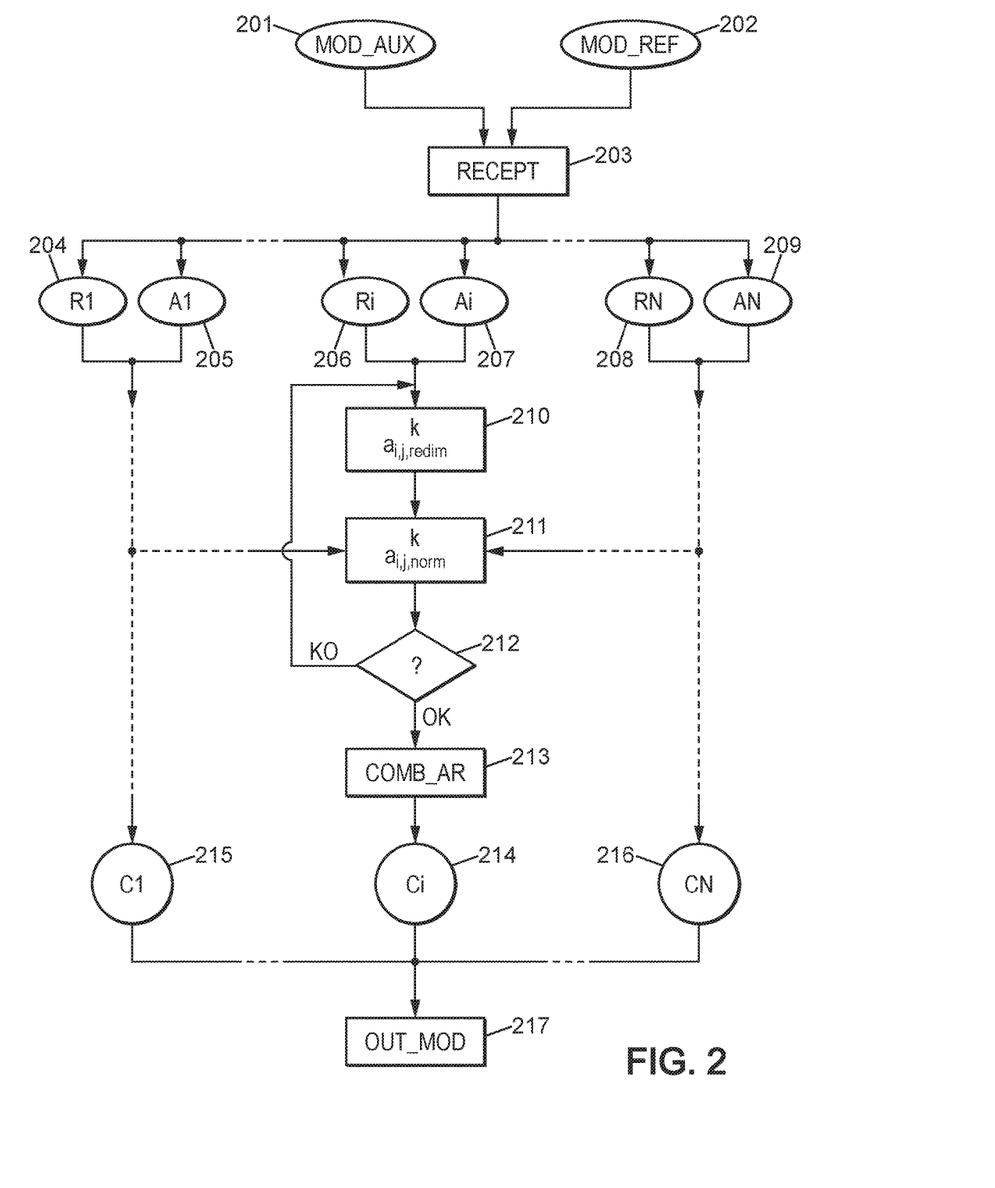
FIG. 2 illustrates an operating diagram of a method in an embodiment according to the invention.

FIG. 2 described in detail below may form the flow diagram of the general algorithm of such a computer program.

BRIEF DESCRIPTION OF THE DRAWINGS

Other features and advantages of the invention will also emerge from a reading of the following description. This is purely illustrative and must be read with regard to the accompanying drawings, in which.

DETAILED DESCRIPTION OF THE DRAWINGS

Figure 1:
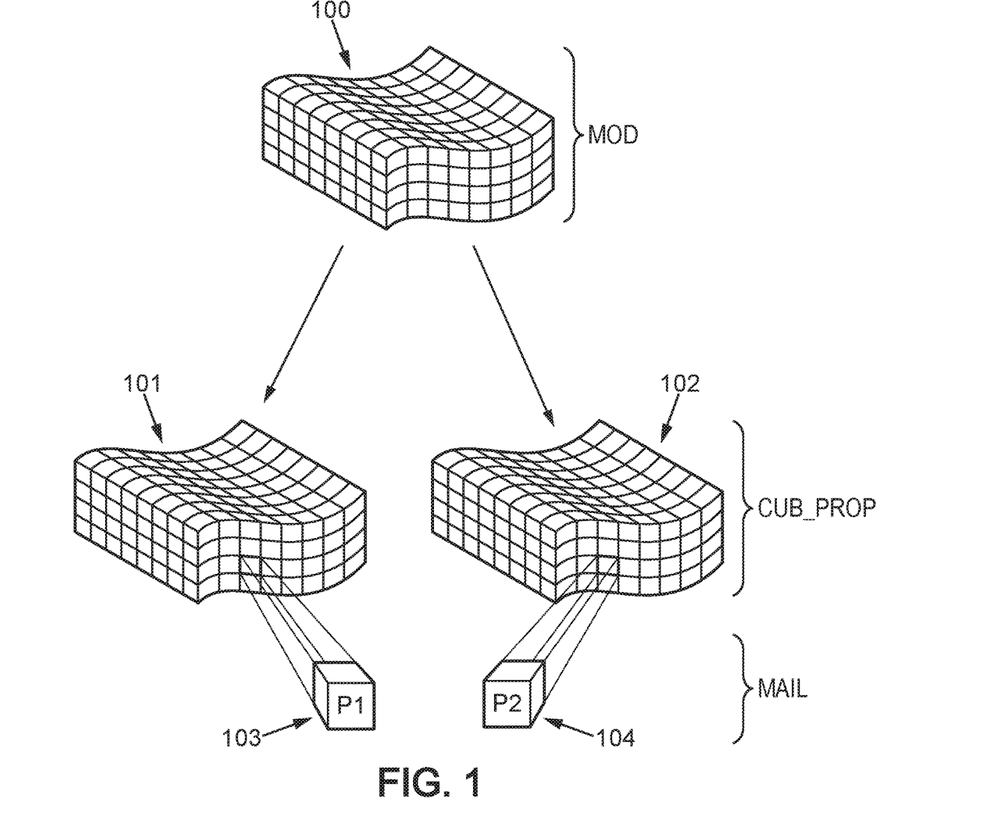
FIG. 1 illustrates a geological model and proportion cubes for the functioning of a possible method according to the invention.

FIG. 1 illustrates a geological model MOD and proportion cubes CUB PROP for the functioning of a possible method according to the invention.

A geological model 100 is not necessarily parallelepipedal. Thus model 100 is usually meshed (MAIL) in order to represent a given volume of a subsoil (real or estimated).

This model 100 can be broken down into proportion cubes (101 and 102). These "cubes" are not necessarily cubic or even parallelepipedal. There exist as many proportion cubes as there are facies represented in the model. Thus, in the situation in FIG. 1, there exist two facies represented in the model 100:
 as first facies corresponding to the proportion cube 101;
 a second facies corresponding to the proportion cube 102.

The proportion cubes represent the estimated proportion (or estimated probability of presence) of the facies considered in this cube.

For example, if these cubes are meshed, a mesh 103 of the first cube may be associated with a proportion value P1. The mesh 104 of the cube 102 (and corresponding to the same volume of the model as the mesh 103, i.e. positioned at the same point in the model) may be associated with a proportion value P2. If the model comprises only two facies, then P1+P2 is equal to 1.

FIG. 2 illustrates an operating diagram of a method in one embodiment according to the invention.

The operating mode described in this figure is only one of the possible operating modes of the invention.

Initially, an auxiliary model 201 and a reference model 202 are received (step 203). These models 201 and 202 each comprise N proportion cubes as described previously. Naturally this reception of models comprising proportion cubes for each of the N facies of the models is equivalent to the direct reception, for each of the end facies, of a pair of proportion cubes (each pair comprising a reference proportion cube and an auxiliary proportion cube).

Once received, it is possible to form N pairs of proportion cubes:

a reference proportion cube R1 204 and an auxiliary proportion cube A1 205 corresponding to the facies 1;
. . .
a reference proportion cube Ri 206 and an auxiliary proportion cube Ai 207 corresponding to the facies i;
. . .
a reference proportion cube RN 208 and an auxiliary proportion cube AN 209 corresponding to the facies N.

For each of the pairs thus formed, a modification to the auxiliary proportion cube is made as described below. Only the index i (representing the facies in question) differs in the description (i.e. i∈[1,N], i being integer).

For the facies i, $a_{i,j}^0$ designates the proportion value associated with the mesh j of the auxiliary proportion cube Ai 207. In addition, $r_{i,j}^0$ designates the proportion value associated with the mesh j of the reference proportion cube Ri.

The method described below is based on the calculation of certain values of a sequence $(a_{i,j}^k)_k$. Naturally, the value of the sequence $(a_{i,j}^k)_k$ for k=0 is $a_{i,j}^0$, the proportion value associated with the mesh j of the auxiliary proportion cube Ai 207 previously defined.

The sequence $(a_{i,j}^k)_k$ is thus defined:

$$a_{i,j}^{k+1} = \frac{a_{i,j,redim}^k}{\sum_{w=1}^{N} a_{w,j,redim}^k}$$

with $$a_{i,j,redim}^k = \frac{a_{i,j}^k \cdot \overline{r_i^0}}{\overline{a_i^k}}, \overline{r_i^0}$$

the mean value of $r_{i,j}^k$ over all the meshes j of the reference proportion cube and $\overline{a_i^k}$ the mean value of the values $a_{i,j}^k$ over all the meshes j. Naturally all the meshes j may also correspond to a subset of the meshes of the reference (or auxiliary) proportion cube.

It is also possible to define this sequence in an equivalent manner by $$a_{i,j}^{k+1} = \frac{\frac{a_{i,j}^k \cdot \overline{r_i^0}}{\overline{a_i^k}}}{\sum_{w=1}^{N} \frac{a_{w,j}^k \cdot \overline{r_w^0}}{\overline{a_w^k}}}$$

or by any other similar mathematical formula.

Thus, in a first step (step 210), it is useful to calculate a "resized" proportion cube $a_{i,j,redim}^k$. This step (i.e.

$$\left( i.e. \ a_{i,j,redim}^k = \frac{a_{i,j}^k \cdot \overline{r_i^0}}{\overline{a_i^k}} \right)$$

aims to align the mean proportion of the auxiliary proportion cube with the mean proportion of the reference proportion cube.

Nevertheless, this step (step 210) may modify the mesh proportion values, and the property according to which the sum for all the facies of the corresponding meshes is equal to 1 may no longer be complied with.

Thus, in a second step (step 211), the meshes of the "resized" proportion cube $a_{i,j,redim}^k$ are standardised (i.e.

$$\left( i.e. \ a_{i,j}^{k+1} = a_{i,j,norm}^k = \frac{a_{i,j,redim}^k}{\sum_{w=1}^{N} a_{w,j,redim}^k} \right)$$

so that the meshes for all the facies add up to 1. This standardisation involves the other auxiliary proportion cubes for all the facies.

Thus it may be useful to calculate the various sequences $(a_{i,j}^k)_k$ for the various values of i in parallel (i.e. performing the first step described previously over all the sequences $(a_{i,j}^k)_k$ for a given rank k and then standardising the proportion values according to the resized values determined during this first step.

Nevertheless, it is possible to calculate in parallel only a subset of sequences $(a_{i,j}^k)_k$ (i.e. the other sequences being for example considered to be constant), the subset comprising for example more than two elements. This may be particularly advantageous if some facies are not considered to be significant.

The sequences $(a_{i,j}^k)_k$ calculated thus converge very quickly towards so-called "limit" values.

Thus if (test 212, output KO) the distance between the mean of proportions of the reference proportion cube and the mean over j of the values in the sequence $(a_{i,j}^k)_k$ is greater than a predetermined distance, the two steps 210 and 211 are re-executed while calculating the value of the sequence with rank k+1. In the contrary case (test 212, output OK), it is possible to consider that the modifications made on the auxiliary proportion cube Ai are sufficient (replacing the proportion values of the auxiliary cubes $a_{i,j}^0$ with the last calculated values of the sequence $a_{i,j}^k$).

Naturally other end conditions (for the test 212) are possible, such as for example the exceeding of a predetermined number of iterations (e.g. three iterations) or a combination of previously mentioned conditions (e.g. a minimum number of iterations and a minimum distance).

Once the end condition is fulfilled, a combination of the "modified" auxiliary proportion cube A1 and the reference proportion cube Ri may be made (step 213). This combination (i.e. the proportion cube Ci 214) may be made mesh by mesh.

For example, for a mesh j, the proportions $c_{i,j}$ of the combined cube Ci may be equal to $c_{i,j} = \alpha \cdot a_{i,j}^k + \beta \cdot r_{i,j}^\delta$ with K the maximum iteration rank of the loop over steps 210 and 211. The value of β may be equal to (1−α). In addition, the values of α and μ (or simply of α, if there exists a relation between these two values) may be determined according to the confidence granted by the geologists or well engineers in the data of the various cubes to be combined.

For each of the other facies i (i ∈[1,N], i being integer), a combined proportion cube Ci (i.e. 215 or 216) may be determined. The values of the combination coefficients α and μ (for the combination of each of these cubes) may be identical or different depending on the facies.

Once all the combined proportion cubes have been determined, these may be returned to the user or to a modelling tool (step 217).

Figure 3A:
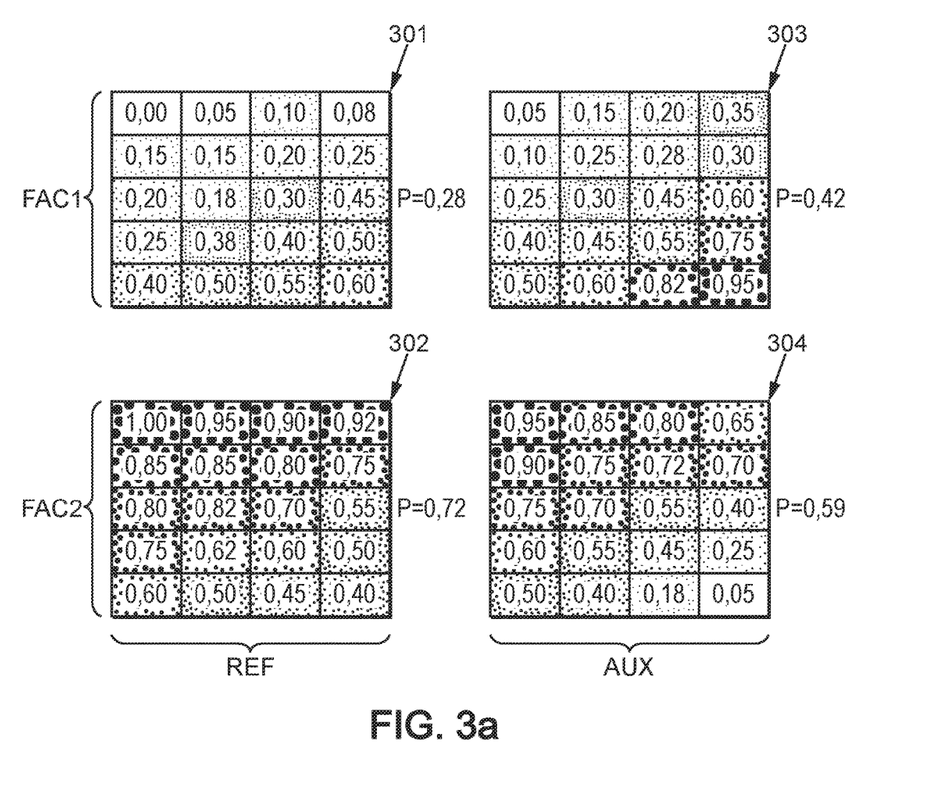
FIG. 3a illustrates an example of two reference proportion cubes and an example of two auxiliary proportion cubes received for the functioning of a possible method according to the invention.

By way of illustration, FIG. 3a illustrates an example of two reference proportion cubes and an example of two auxiliary proportion cubes:
- FAC1-REF 301 is a reference proportion cube for the facies 1;
- FAC1-AUX 303 is an auxiliary proportion cube for the facies 1;
- FAC2-REF 302 is an auxiliary proportion cube for the facies 2;
- FAC2-AUX 304 is a reference proportion cube for the facies 2.

The cube FAC1-REF 301 has a mean proportion of P=0.28. The cube FAC2-REF 302 has a mean proportion of P=0.72. The sum of these mean proportions is indeed 1. Moreover, the corresponding meshes of the various facies (e.g. the two meshes at the top right of the cubes FAC1-REF and FAC2-REF) have combined proportions adding up to 1 (e.g. 0.08+0.92=1).

The cube FAC1-AUX 303 has a mean proportion of P=0.41. The cube FAC2-AUX 304 has a mean proportion of P=0.59. The sum of these mean proportions is indeed 1. Moreover, the corresponding meshes of the various facies (e.g. the two meshes at the top right of the cubes FAC1-AUX and FAC2-AUX) have combined proportions adding up to 1 (e.g. 0.35+0.65=1).

Thus the mean proportions of the various cubes for each of the facies FAC1 and FAC2 are not identical for the auxiliary proportion cube and the reference proportion cube.

Figure 3B:
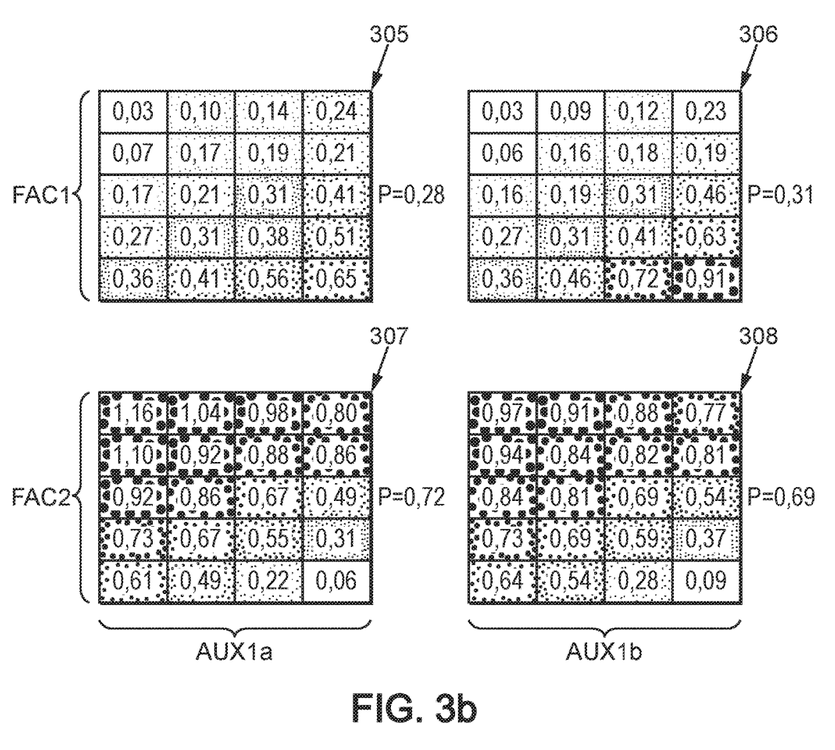
FIG. 3b illustrates an example of two auxiliary proportion cubes modified following an iteration of a possible standardisation according to an embodiment of the invention.

FIG. 3b illustrates an example of an auxiliary proportion cube modified following a possible modification according to an embodiment of the invention
- FAC1-AUX1a 305 is the auxiliary proportion cube 303 modified after execution of step 210 as described in relation to FIG. 2;
- FAC1-AUX1b 306 is the auxiliary proportion cube 303 modified after execution of steps 210 and 211 as described in relation to FIG. 2;
- FAC2-AUX1a 307 is the auxiliary proportion cube 304 modified after execution of step 210 as described in relation to FIG. 2;
- FAC2-AUX1b 308 is the auxiliary proportion cube 304 modified after execution of steps 210 and 211 as described in relation to FIG. 2.

The cube FAC1-AUX1a 305 has a mean proportion of P=0.28 (mean proportion of the reference proportion of the reference proportion cube FAC1-REF 301). The cube FAC2-AUX1a 304 has a mean proportion of P=0.72 (mean proportion of the reference proportion of the reference proportion cube FAC2-REF 302). The sum of these mean proportions in indeed 1. Nevertheless, the corresponding meshes of the various facies (e.g. the two meshes at top right of the cubes FAC1-AUX1a and FAC2-AUX1a) have associated proportions not adding up to 1 (e.g. 0.24+0.80=1.04). Therefore there exists a need to standardise these values.

The cube FAC1-AUX1b 306 has a mean proportion of P=0.31. The cube FAC2-AUX1b 308 has a mean proportion of P=0.69. The sum of these mean proportions is indeed 1. Moreover, the corresponding meshes of the various facies, e.g. the two meshes at the top right of the cubes FAC1-AUX1b and FAC2-AUX1b) have associated proportions adding up to one 1 (e.g. 0.23+0.77=1).

Figure 3C:
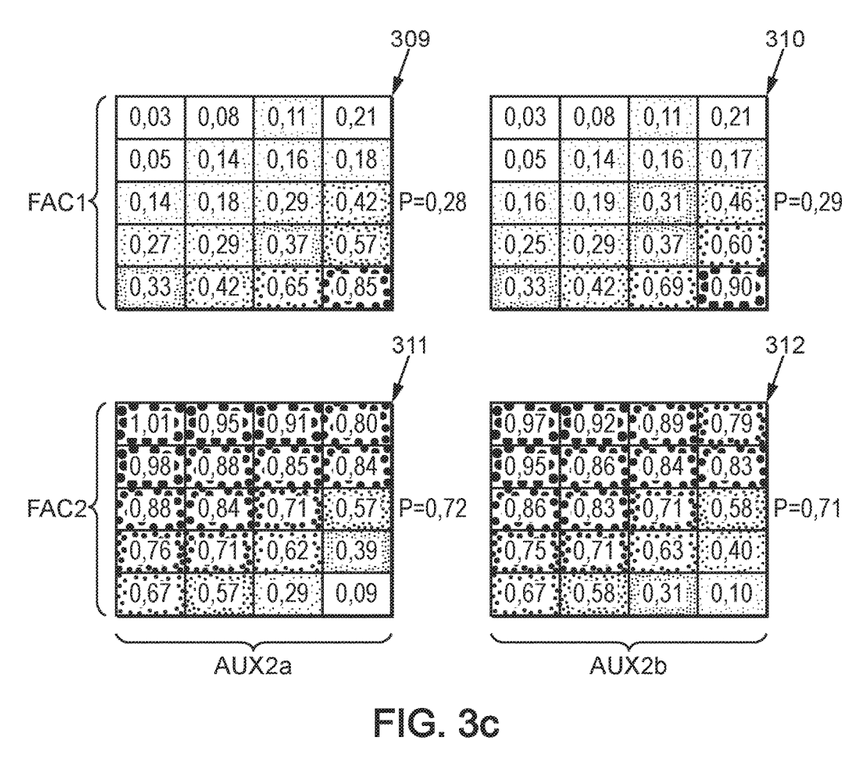
FIG. 3c illustrates an example of two auxiliary proportion cubes modified following two iterations of a possible standardisation according to an embodiment of the invention.

FIG. 3c illustrates an example of an auxiliary proportion cube modified following two iterations of a possible standardisation according to an embodiment of the invention.
- FAC1-AUX2a 309 is the auxiliary proportion cube 306 modified after execution of step 210 as described in relation to FIG. 2;
- FAC1-AUX1b 310 is the auxiliary proportion cube 306 modified after execution of steps 210 and 211 as described in relation to FIG. 2;
- FAC2-AUX2a 311 is the auxiliary proportion cube 308 modified after execution of step 210 as described in relation to FIG. 2;
- FAC2-AUX2b 312 is the auxiliary proportion cube 308 modified after execution of steps 210 and 211 as described in relation to FIG. 2;

The cube FAC1-AUX2a 309 has a mean proportion of P=0.28 (mean proportion of the reference proportion cube FAC1-REF 301). The cube FAC2-AUX2a 311 has a mean proportion of P=0.72 (mean proportion of the reference proportion cube FAC2-REF 302). The sum of these mean proportions in indeed 1. Nevertheless, the corresponding meshes of the various facies (e.g. to two meshes at top right of the cubes FAC1-AUX2a and FAC2-AUX2a) have associated proportions not adding up to 1 (e.g. 0.21+0.80=1.01). Therefore there exists a need to standardise these values.

The cube FAC1-AUX2b 310 has a mean proportion of P=0.29. The cube FAC2-AUX2b 312 has a mean proportion of P=0.71. The sum of these mean proportions is indeed 1. Moreover, the corresponding meshes of the various facies (e.g. the two meshes at the top right of the cubes FAC1-AUX2b and FAC2-AUX2b) have associated proportions adding up to one 1 (e.g. 0.21+0.79=1).

Naturally, in these last auxiliary proportion cubes, the proportion means are not equal to the mean proportions of the reference proportion cubes. Nevertheless, these proportion means of the modified auxiliary cubes are closer and closer to these mean proportions of the reference proportion cubes as the iterations continue.

Figure 4:
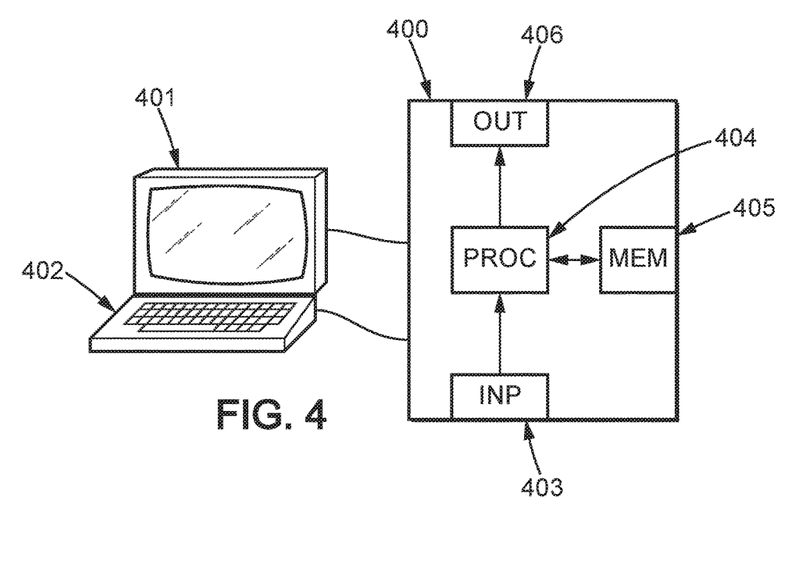
FIG. 4 illustrates a computing device for implementation according to an embodiment of the invention.

FIG. 4 depicts an example of a device for determining at least one combined proportion cube in an embodiment of the invention.

In this embodiment, the device comprises a computer 400 comprising a memory 404 for storing instructions for implementing the method, the data received as auxiliary and reference proportion cubes, and temporary data for performing the various steps of the method as described previously.

The computer further comprises a circuit for determining at least one combined proportion cube 401. This circuit may for example be:
- a processor able to interpret instructions in the form of a computer program, or an electronic card wherein the steps of the method of the invention are described in the silicon, or a programmable electronic chip such as an FPGA (standing for Field-Programmable Gate Array) chip.

This computer comprises an input interface 402 for receiving data such as the cubes or the models cited previously, and an output interface 403 for supplying modified cube data. Finally, the computer comprises, to afford easy interaction with a user, a screen 405, a mouse and a keyboard 406. The output interface 406 may be merged with a video output affording display on the screen 401.

Moreover, the functional diagram presented in FIG. 2 is a typical example of as program, some instructions of which can be implemented with the equipment described. In this regard, FIG. 2 may correspond to the flow diagram of the general algorithm of a computer program within the meaning of the invention.

Naturally, the present invention is not limited to the embodiments described above by way of examples; it extends to other variants.

Other embodiments are possible.

The invention claimed is:

1. A method for determining at least one combined proportion cube for a facies of a geological model representing a real subsoil comprising a plurality of facies, the method comprising:
for each facies in the plurality of facies:
receiving a reference proportion cube, said reference proportion cube having a first mean proportion;
receiving an auxiliary proportion cube;
for at least one facies in the plurality of facies:
modifying said auxiliary proportion cube, said modified auxiliary proportion cube having a second mean proportion, the second mean proportion being at a distance less than a predetermined distance from the first mean proportion;
combining said reference proportion cube and said modified auxiliary proportion cube into the combined proportion cube;
using said combined proportion cube for exploitation of hydrocarbons or gas.

2. The method according to claim 1, in which, the combination being linear, the sum of the coefficients of said linear combination is equal to 1.

3. The method according to claim 1, in which for each facies i in the plurality of facies:
the reference proportion cube comprises a first plurality of meshes, each of said meshes j being associated with an initial reference local proportion value $r_{i,j}^0$,
the auxiliary proportion cube comprises a second plurality of meshes, each of said meshes j being associated with an initial auxiliary local proportion value $a_{i,j}^0$,
for at least two facies i in the plurality of facies, the modification may comprise, for each mesh j:
a) initialization of a current auxiliary local proportion value $a_{i,j}^k$ to $a_{i,j}^0$;
b) determination (210) of a first current auxiliary local proportion value $a_{i,j,redim}^k$ according at least to:
the mean of the initial reference local proportion values $\overline{r_i^0}$ for the meshes of the reference proportion cube of the facies i,
the mean of the current auxiliary local proportion values $\overline{a_i^k}$ for the meshes of the auxiliary proportion cube of the facies i,
the current auxiliary local proportion value $a_{i,j}^k$ for the mesh j of the auxiliary proportion cube of the facies i;

c) determination of a second current auxiliary local proportion value $a_{j,norm}^k$ according at least to:
the resized current auxiliary local proportion value for $a_{i,j,redim}^k$ the facies i,
the sum of the resized current auxiliary local values $a_{i,j,redim}^k$ for all the facies in the plurality of facies;
d) if the second mean proportion is not at a distance less than a predetermined distance from the first mean proportion, reiteration of steps a) to c) replacing the initial reference local proportion value $a_{i,j}^0$ with $a_{j,norm}^k$;
and in which the modification is made in parallel for the at least two facies.

4. The method according to claim 1, in which
for each facies i,
the reference proportion cube comprises a first plurality of meshes, each of said meshes j being associated with an initial reference local proportion value $r_{i,j}^0$,
the auxiliary proportion cube comprises a second plurality of meshes, each of said meshes j being associated with an initial auxiliary local proportion value $a_{i,j}^0$,
for at least two facies i in the plurality of facies, the modification may comprise, for each mesh j;
a) initialization of a current auxiliary local proportion value $a_{i,j}^k$ to $a_{i,j}^0$;
b) determination of a first current auxiliary local proportion value $a_{i,j,redim}^k$ according at least to:
the mean of the initial reference local proportion values $\overline{r_i^0}$ for the meshes of the reference proportion cube of the facies i,
the mean of the current auxiliary local proportion values $\overline{a_i^k}$ for the meshes of the auxiliary proportion cube of the facies i,
the current auxiliary local proportion value $a_{i,j}^k$ for the mesh j of the auxiliary proportion cube of the facies i;
c) determination of a second current auxiliary local proportion value $a_{j,norm}^k$ according at least to;
the resized current auxiliary local proportion value $a_{i,j,redim}^k$ for the facies i,
the sum of the resized current auxiliary local values $a_{i,j,redim}^k$ for all the facies, in the plurality of facies;
d) if a number of reiterations of steps a) to c) is less than a given threshold, reiteration of steps a) to c) replacing the initial reference local proportion value $a_{i,j}^0$ with $a_{j,norm}^k$;
and in which the modification is made in parallel for the at least two facies.

5. The method according to claim 1, for the at least one facies i in the plurality of facies, the reference proportion cube comprising a first plurality of meshes, each of said meshes j being associated with an initial reference local proportion value $r_{i,j}^0$, the auxiliary proportion cube comprising a second plurality of meshes, each of said meshes j being associated with an initial auxiliary local proportion value $a_{i,j}^0$,
in which the modification comprises, for each mesh j:
determination of a first current auxiliary local proportion value $a_{i,j,redim}^k$ according at least to:
the mean of the initial reference local proportion values $\overline{r_i^0}$ for the meshes of the reference proportion cube of the facies i,
the mean of the current auxiliary local proportion values $\overline{a_i^0}$ for the meshes of the auxiliary proportion cube of the facies i,
the current auxiliary local proportion value $a_{i,j}^0$ for the mesh j of the auxiliary proportion cube of the facies i.

6. The method according to claim 3, in Which the first current auxiliary local proportion value $a_{i,j,redim}^k$ is a function of $$\frac{a_{i,j}^k \cdot \overline{r_i^0}}{\overline{a_i^k}}.$$

7. The method according to claim 5, in which the first current auxiliary local proportion value $a_{i,j,redim}^k$ is a function of $$\frac{a_{i,j}^0 \cdot \overline{r_i^0}}{\overline{a_i^0}}.$$

8. The method according to claim 3, in which the second current auxiliary local proportion value $a_{i,j,norm}^k$ is a function of $$\frac{a_{i,j,redim}^k}{\sum_{w=1} a_{w,j,redim}^k}$$

with a facies contained in the plurality of facies.

9. A device with a processor for determining at least one combined proportion cube for a facies of a geological model representing a real subsoil comprising a plurality of facies, the device comprising:
an interface for receiving a reference proportion cube, said reference proportion cube having a first mean proportion;
an interface for receiving an auxiliary proportion cube;
a circuit suitable for at least one facies of the plurality of facies:
modifying said auxiliary proportion cube, said modified auxiliary proportion cube having a second mean proportion, the second mean proportion being at a distance less than a predetermined distance from the first mean proportion;
combining said reference proportion cube and said modified auxiliary proportion cube into the combined proportion cube;
using said combined proportion cube for exploitation of hydrocarbons or gas.

10. A non-transitory computer readable storage medium, having stored thereon a computer program comprising program instructions, the computer program being loadable into a data-processing unit and adapted to cause the data-processing unit to carry out the determination of at least one combined proportion cube for a facies of a geological model representing a real subsoil comprising a plurality of facies, the determination of at least one combined proportion cube comprising the steps of:
for each facies in the plurality of facies:
receiving a reference proportion cube, said reference proportion cube having a first mean proportion;
receiving an auxiliary proportion cube;
for at least one facies in the plurality of facies:
modifying said auxiliary proportion cube, said modified auxiliary proportion cube having a second mean proportion, the second mean proportion being at a distance less than a predetermined distance from the first mean proportion;
combining said reference proportion cube and said modified auxiliary proportion cube into the combined proportion cube;
using said combined proportion cube for exploitation of hydrocarbons or gas.

* * * * *

UNITED STATES PATENT AND TRADEMARK OFFICE
CERTIFICATE OF CORRECTION

PATENT NO. : 10,379,258 B2  
APPLICATION NO. : 14/897145  
DATED : August 13, 2019  
INVENTOR(S) : Tawile et al.

Page 1 of 2

It is certified that error appears in the above-identified patent and that said Letters Patent is hereby corrected as shown below:

In the Claims

Column 11, Line 59:

Delete "$a_{i,j,redim}{}^{k}$" and insert -- $a^{k}_{i,j,redim}$ --

Column 12, Line 2:

Delete "$a_{j,norm}{}^{k}$" and insert -- $a^{k}_{j,norm}$ --

Column 12, Line 4:

Delete "$a_{i,j,redim}{}^{k}$" and insert -- $a^{k}_{i,j,redim}$ --

Column 12, Line 6:

Delete "$a_{i,j,redim}{}^{k}$" and insert -- $a^{k}_{i,j,redim}$ --

Column 12, Line 11:

Delete "$a_{j,norm}{}^{k}$" and insert -- $a^{k}_{j,norm}$ --

Column 12, Line 27:

Delete "$a_{i,j,redim}{}^{k}$" and insert -- $a^{k}_{i,j,redim}$ --

Column 12, Line 37:

Delete "$a_{j,norm}{}^{k}$" and insert -- $a^{k}_{j,norm}$ --

Signed and Sealed this  
Tenth Day of December, 2019

Andrei Iancu  
*Director of the United States Patent and Trademark Office*

CERTIFICATE OF CORRECTION (continued)
U.S. Pat. No. 10,379,258 B2

Column 12, Line 39:

Delete "$a_{i,j,redim}{}^{k}$" and insert -- $a^k_{i,j,redim}$ --

Column 12, Line 41:

Delete "$a_{i,j,redim}{}^{k}$" and insert -- $a^k_{i,j,redim}$ --

Column 12, Line 46:

Delete "$a_{j,norm}{}^{k}$" and insert -- $a^k_{j,norm}$ --

Column 12, Line 59:

Delete "$a_{i,j,redim}{}^{k}$" and insert -- $a^k_{i,j,redim}$ --

Column 13, Line 2:

Delete "$a_{i,j,redim}{}^{k}$" and insert -- $a^k_{i,j,redim}$ --

Column 13, Line 11:

Delete "$a_{i,j,redim}{}^{k}$" and insert -- $a^k_{i,j,redim}$ --

Column 13, Line 20:

Delete "$a_{i,j,norm}{}^{k}$" and insert -- $a^k_{i,j,norm}$ --

Column 13, Line 25:

Delete "$\dfrac{a^k_{i,j,redim}}{\sum_{w=1} a^k_{w,j,redim}}$" and insert -- $\dfrac{a^k_{i,j,redim}}{\sum_{w} a^k_{w,j,redim}}$ --